United States Patent [19]

Netter et al.

[11] Patent Number: 5,124,641
[45] Date of Patent: Jun. 23, 1992

[54] EDDY CURRENT PROBE METHOD AND DEVICE FOR SIMULTANEOUSLY MEASURING THE DISTANCE BETWEEN METAL TUBES AND OXIDE THICKNESS ON THE TUBES

[75] Inventors: Alain Netter, Villefontaine; Gabriel Leroy, Caluire et Cuire, both of France

[73] Assignees: Framatome, Courbevoie; Compagnie Generale des Matières Nucléaires, Velizy Villacoublay, both of France

[21] Appl. No.: 634,532

[22] Filed: Dec. 27, 1990

[30] Foreign Application Priority Data

Dec. 27, 1989 [FR] France ................. 89 17261

[51] Int. Cl.⁵ .................... G01B 7/10; G01B 7/14; G21C 17/017
[52] U.S. Cl. .................... 324/230; 324/202; 324/207.16; 324/219; 324/262; 376/245
[58] Field of Search ............ 324/202, 207.11, 207.15, 324/207.16, 207.26, 219-221, 226, 227, 229-231, 262; 376/245, 249, 258

[56] References Cited

U.S. PATENT DOCUMENTS

| | | | |
|---|---|---|---|
| 4,625,165 | 11/1986 | Rothstein | 324/220 |
| 4,810,964 | 3/1989 | Granberg et al. | 324/207.16 X |
| 4,814,703 | 3/1989 | Carr et al. | 324/229 X |
| 4,855,678 | 8/1989 | Kreiskorte | 324/262 |
| 4,862,079 | 8/1989 | Chickering et al. | 324/226 X |
| 4,864,239 | 9/1989 | Casarcia et al. | 324/262 |

FOREIGN PATENT DOCUMENTS 0170341 2/1986 European Pat. Off.
0067405 4/1984 Japan ................. 324/230

OTHER PUBLICATIONS

Emori, "Method and device for measuring thickness of coating film on inside surface of coated pipe for nuclear fuel"–vol. 8, #1—Jan. 6, 1984 Japanese Abstracts.

Primary Examiner—Gerard R. Strecker
Attorney, Agent, or Firm—Pollock, Vande Sande & Priddy

[57] ABSTRACT

The distance between substantially parallel metal tubes forming a flat sheet and the thicknesses of oxide layers covering the tubes are simultaneously measured. The tubes may particularly be sheaths of a nuclear fuel assembly. The method includes the step of moving an eddy current probe parallel to the sheet while maintaining said probe applied onto the successive tubes of the sheet; recording an electric signal delivered by the probe and representing impedance variations of said probe responsive to displacement of said probe; computing the distances between successive ones of said rods from measurement of the amounts of displacement of said probe between the extremum values of said electric signal which correspond to successive extrema of said impedance; and deriving the thickness of the oxide layers on successive ones of said tubes from successive comparisons between the value of the respective extremum and values obtained by measurement of the impedance value on standard tubes carrying predetermined known thicknesses of said oxide.

10 Claims, 4 Drawing Sheets

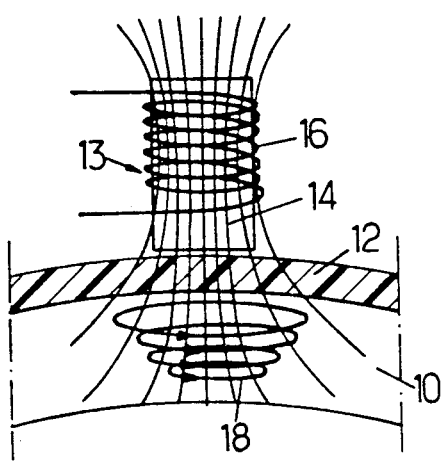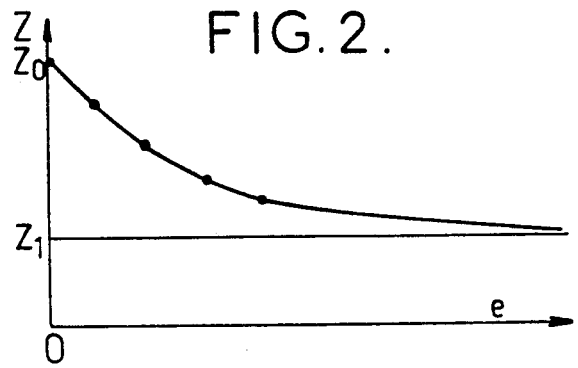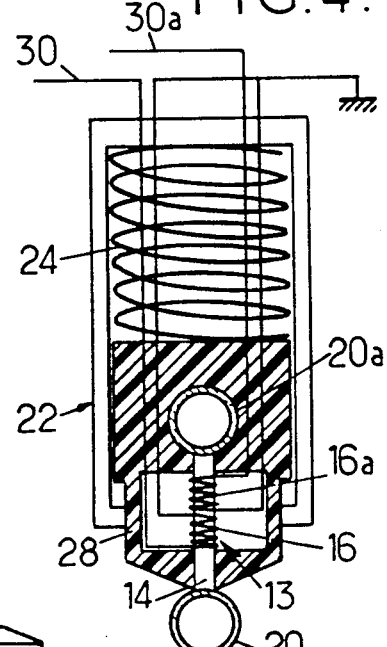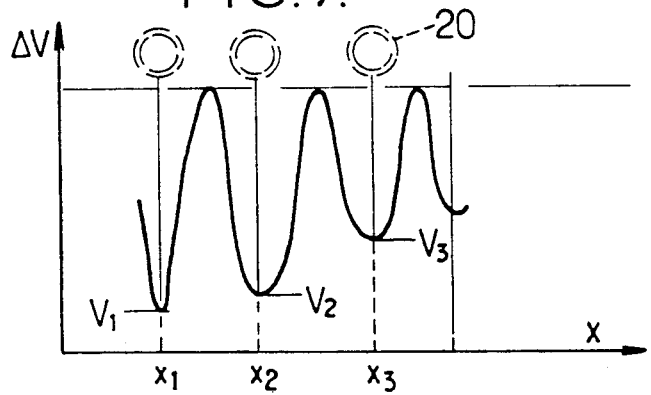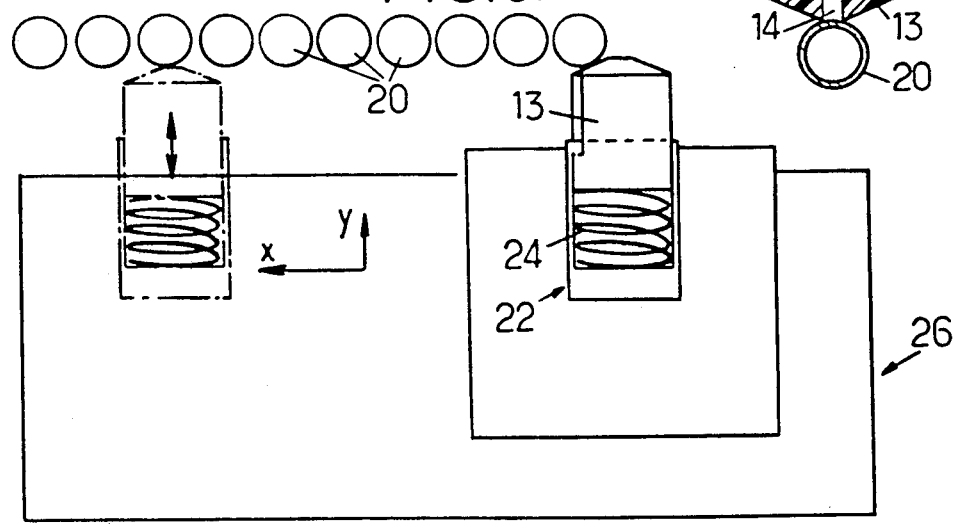

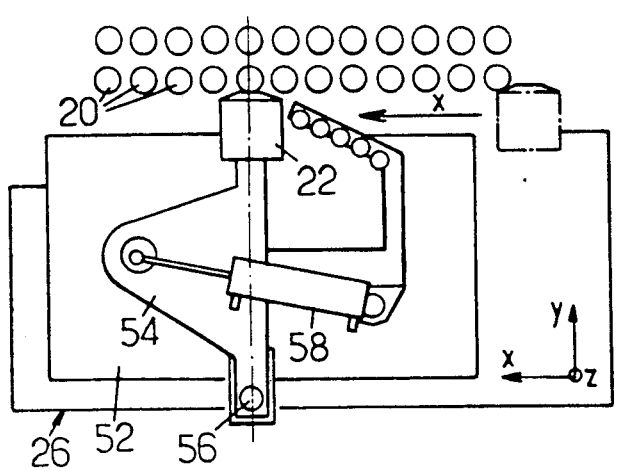
FIG. 5B.
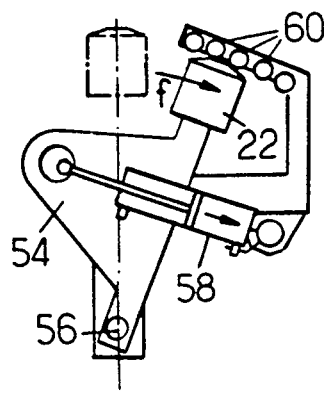
FIG. 5A.
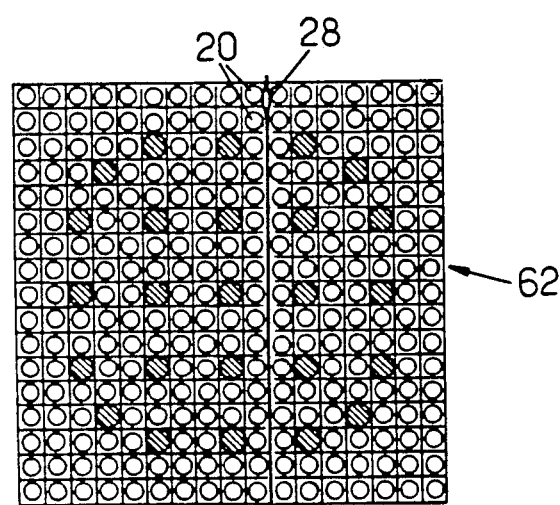
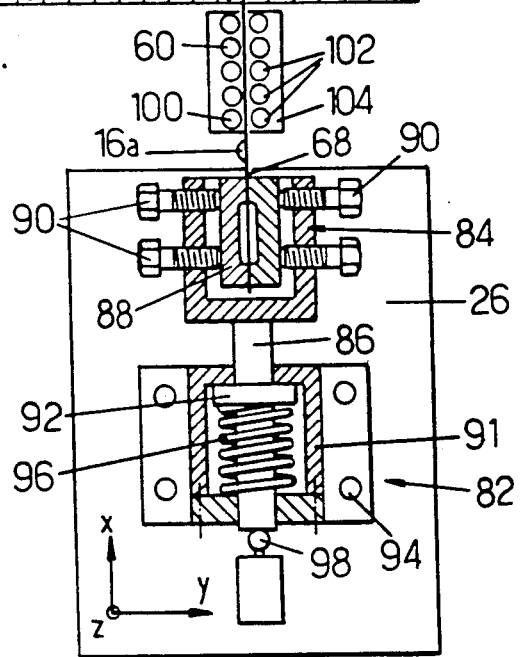
FIG. 12.

EDDY CURRENT PROBE METHOD AND DEVICE FOR SIMULTANEOUSLY MEASURING THE DISTANCE BETWEEN METAL TUBES AND OXIDE THICKNESS ON THE TUBES

BACKGROUND OF THE INVENTION

The present invention relates to measurement of the distance between substantially parallel metal tubes forming a bundle and the thickness of an oxide layer which may possibly cover the tubes. It finds a particularly important, although not exclusive, application in the measurement of distance between the metal tubes forming the sheaths of rods belonging to a nuclear fuel assembly and the thickness of oxide layers covering the tubes.

When the fuel assemblies removed from the core of a reactor after an operating cycle are not completely burnt up, they are reloaded into the core at another position. Before such reloading, the assemblies must be checked so as to make sure that they can be run again in the reactor without excessive risk of sheath failure.

It is in particular necessary to check that the spacing between adjacent rods is not reduced locally in an excessive way. The reduction of spacing may in particular be caused by bending of certain rods, locally reducing the spacing between mutually facing surfaces of the sheaths. The reduction may generate hot points and result in local failure of the sheaths, especially when they contact each other. But even if the consequences are not as serious, the variations of spacing create defects in the cooling flow and disturb the thermodynamic cycle detrimentally to the correct operation of the reactor.

It is also desirable to measure the thickness of the oxide layer formed on the surface of the sheaths in contact with the coolant. The oxide layer reduces the heat exchange coefficient between the sheath and the coolant and consequently causes overheating of the sheath. In fuel assemblies for pressurized water nuclear reactors, the zirconium base alloy sheaths are progressively covered with a layer of zirconia. When the thickness of this layer exceeds a limit, about 100 $\mu$m in present day pressurized water reactors, oxide formation tends to increase and may lead to cracking of the sheath and to the egress of fission products into the coolant.

At the present time, the spacing between the rods of an assembly is generally measured by causing a camera to travel opposite the gap between rods, along the assembly. The camera is equipped with a reference grid and an operator follows the variations of spacing between the rods on the display screen. This method of measurement is tiring and its reliability is uncertain.

It is known to measure the oxide thickness at given points of a rod sheath situated at the periphery of a fuel assembly using an eddy current probe which is brought into contact with the sheath to be examined, by moving it orthogonally to the sheath, then raising it and bringing it in front of the next measurement point. The device for such measurement has no other function. The method of bringing the probe to each point of measurement requires precise location of the position of the sheath so that the probe be placed radially. The measurements are very slow when it is decided to make the measurement at sufficiently numerous and closely spaced points.

European 0,170,341 discloses eddy current measurement of a film thickness, with reference to a calibration curve prepared from reference plates; there is no suggestion to measure the distance between parallel tubes. Japanese patent application No. 58166203 only teaches that a similar method makes it possible to measure the thickness of a layer on a tube. As to U.S. Pat. No. 4,814,703, it discloses a device for measuring the variations of thickness of an epoxy layer.

SUMMARY OF THE INVENTION

The invention provides a method and a device for simultaneously measuring the distance between substantially parallel metal tubes forming a sheet, particularly between tubes forming the sheaths of the rods of a fuel assembly, and the thickness of oxide covering the tubes. An ancillary object of the invention is to significantly reduce the time for examining an assembly, as compared with the prior art. A further object is to provide a device which can measure the spacing of rods and the thickness of oxide layers inside the assembly.

To this end, there is provided a method for simultaneously measuring the distance between substantially parallel metal tubes forming a flat bundle and the thickness of oxide covering the tubes. According to this method, an eddy current probe is moved parallel to the bundle while applying it to the tube; an electric signal delivered by the probe and representing the impedance variations of the probe is recorded; the distance between the rods is deduced from the measurement of the displacement of the probe between values of the signal corresponding to successive impedance extremes; and the thickness of oxide on each tube is derived from a comparison between the value of the respective extreme and at least one value obtained by measurement on a standard tube carrying a predetermined known thickness of oxide.

A device for implementing the above-defined method comprises an eddy current probe; means for moving the probe in a given direction and measuring the displacement of the probe, said probe comprising means for biasing it resiliently transversely to the direction of movement, and applying it on the tubes met with; measurement means delivering a signal as a function of the impedance of the probe; means for processing the signal for determining two extreme values thereof and the locations of the probe corresponding to these values; and means for computing the thickness of the insulating layer on the tubes by comparison between said values and at least one value corresponding to a predetermined known thickness.

In a first embodiment of the apparatus, for measuring the distance between the rod sheaths belonging to an external sheet of a nuclear fuel assembly, the measurement apparatus comprises a cross-movement table having a plate on which the probe is mounted by means biasing it resiliently in one of the displacement directions of the table, said plate being further movable on the table by means for causing the probe to travel over a plurality of parallel tubes having predetermined and known thicknesses of oxide and for bringing it into a measurement position where it is parallel to said direction of displacement.

BRIEF DESCRIPTION OF THE DRAWINGS

The invention will be better understood from the following description of particular embodiments, given by way of examples. The description refers to the accompanying drawings in which:

FIG. 1 is a general diagram showing the influence of a layer of oxide on the output signal of an eddy current probe;

FIG. 2 is a graph showing the shape of the variation of the signal of a probe applied to a tube as a function of the thickness of oxide on the tube;

FIG. 3 is a diagram showing the displacement of an eddy current probe during implementation of the method according to the invention for examining the rods belonging a lateral sheet of a nuclear fuel assembly;

FIG. 4 shows a possible probe construction which can be used for implementing the invention, in cross-section through a plane passing through the axis of contact against the rods to be examined;

FIG. 5A is a schematical top plan view of the probe and of a plate which carries it, during calibration;

FIG. 5B, similar to FIG. 5A, shows the plate in the position assumed during measurement;

FIG. 7 shows a curve representative of the variations of the analog signal delivered by the measurement probe;

FIG. 12 is a general diagram, in cross-section, through a horizontal plane, showing the use of a measuring head of the type shown in FIGS. 9, 10 or 11 in a measuring device.

DETAILED DESCRIPTION OF PREFERRED EMBODIMENTS

Figure 6:
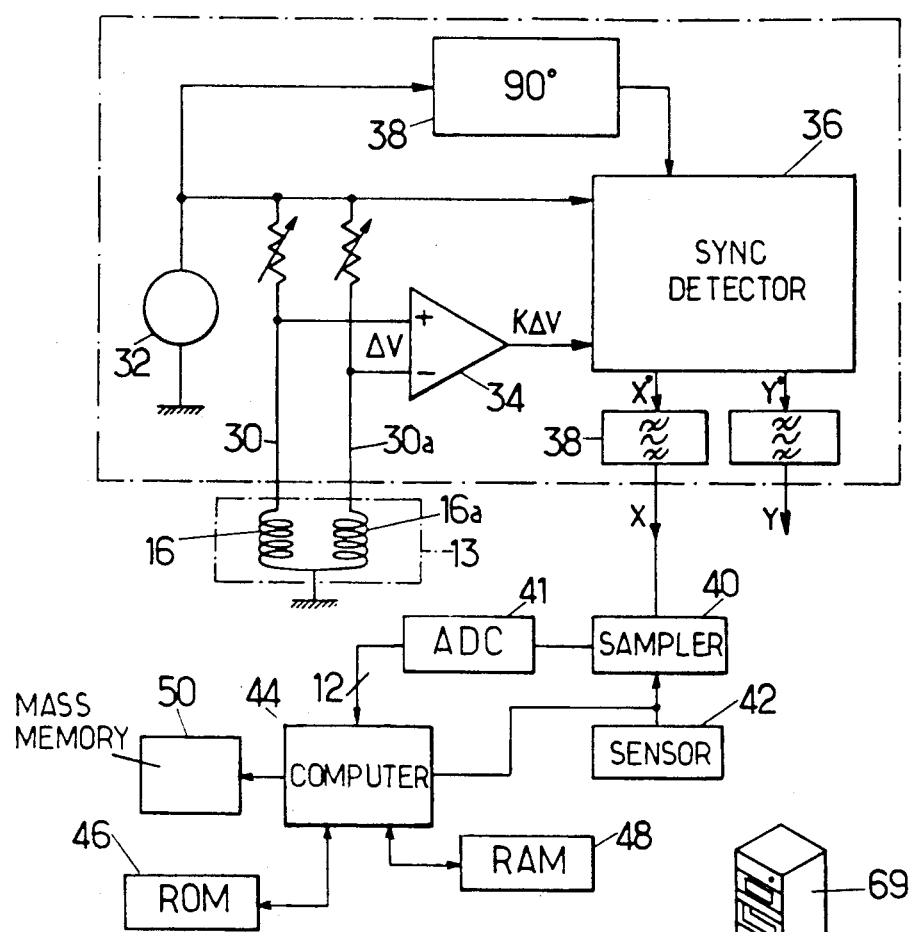
FIG. 6 is a block diagram of the acquisition and processing channel of a device according to a particular embodiment of the invention.

Before describing the invention, the principles of use of an eddy current probe for measuring the thickness of an oxide layer on a metal tube, such as a rod sheath containing oxide fuel, in non-conducting condition, will be discussed.

FIG. 1 shows a fraction of a sheath 10, generally of zirconium-base alloy, on which a non-conducting oxide layer 12 has been formed. An eddy current probe 13 comprises a core of magnetic material 14 carrying a coil 16 to which a high frequency electric voltage is applied, generally between 1 and 4 MHz. When probe 14 is in contact with sheath 10, it induces eddy currents, shown schematically by lines 18, in the electrically conducting part, i.e., in the metal of the sheath. The eddy currents create a reverse magnetic field which induces, in probe 13, a counterelectromotive force which increases the apparent impedance of coil 16. The impedance increase is in reverse relation with the thickness of the insulating layer 12, i.e., it is greater when probe 13 is close to the metal of the sheath. The relation between the impedance Z of coil 16 and the thickness e of the oxide layer has the general shape shown in FIG. 2 : for a zero oxide thickness, the impedance Z of the coil has a maximum value $Z_O$. As the thickness progressively increases, the apparent impedance decreases and tends asymptotically towards a value $Z_1$. The measurement of the impedance Z in the zone where it varies rapidly responsive to the thickness allows the thickness of oxide to be determined. For implementing the invention, the working frequency will be chosen so as to permit a significant measurement at least up to the maximum tolerable thickness, i.e, to about 100 μm in the case of a sheath. A frequency of 1.5 MHz will often be satisfactory in the case of zirconium base alloy sheaths.

Referring to FIG. 3, a device according to the invention permits sequential measurement of the thicknesses of oxide on all rods 20 of a peripheral sheet of a fuel assembly without having to raise the probe, then to move it transversely, then to reapply it at each operation. The device comprises a casing 22 which slidably receives an eddy current probe 13. The probe is slidable parallel to the axis of its coil 16. Resilient means, shown schematically as a spring 24, bias the probe 13 toward the maximum projecting position, shown in solid lines in FIG. 3.

Casing 22 is carried by a cross-movement table 26 which can move it in a direction y parallel to the axis of probe 13 and in an orthogonal direction x. The core of probe 13 (or a head in which this probe is embedded) has a projecting conical end portion whose conicity is such that, when casing 22 is moved in direction x from the initial position where it is shown in FIG. 3, the probe forms a feeler which, under the pressure force of spring 24, remains in permanent contact with the sheaths of rods 20 and follows the contours thereof.

In a typical embodiment, shown in FIG. 4, probe 13 comprises a core 14 fixed along the axis of an insulating material head 28 having a frusto-conical end portion. The core is flush with the end of head 28. It carries the measurement coil 16 which creates a field whose field lines pass through the sheath of the rod 20 to be checked. It also has, behind coil 16, a reference coil 16a which creates a field whose field lines pass through a sheath section 20a embedded in head 28, in contact with core 14 and in alignment with the core. This sheath section represents a reference standard which is chosen non-oxidized. The coils 16 and 16a are connected to external circuits 30 and 30a, to be described hereinbelow.

As shown in FIG. 3, a measurement sequence on the rods 20 of a sheet, when the invention is implemented with the device of FIG. 4, requires bringing case 22, by manually controlled x and y movements of table 26, into the position shown in FIG. 3, then actuating the table 26 for moving the case along direction x. Head 28 then follows the profile of rods 20.

The external circuits for processing the signal delivered by the probe may be as shown in FIG. 6. These circuits comprise an analog part and a digital part. The analog part has a generator 32 delivering a common sine-shaped reference voltage, for example at 1.5 MHz. When the measurement coil 16 has an impedance different from that of the calibration coil 16a, a differential voltage ΔV appears across the coils. A differential amplifier 34 amplifies this voltage and applies it to a synchronous detector 36 which also receives, as reference signals, the output voltage from generator 32 and the same voltage which has been phase-shifted by 90° by a phase shifter 38. The synchronous detector extracts the components X and Y of the vector ΔV which are subjected to band-pass filtering in noise reduction filters 38.

In practice, it is sufficient to use one of the components, for example component X.

During the movements of the head along the sheet of rods (FIG. 3), the output signal ΔV and the component X vary responsive to distance x, as shown in FIG. 7. The signal X has successive maxima corresponding to the probe passing in the middle of the gap between successive rods. These maxima all have substantially the same value, due to the absence of metal material in front of the probe at these positions.

The signal also has successive minima $V_1$, $V_2$, $V_3$ when probe 13 confronts the generatrix of each of the successive rods, for positions $x_1$, $x_2$, $x_3$ of the probe. The values of the minima depend directly on the oxide thickness present on the sheath.

Calculation of the position $x_1$, $x_2$, $x_3$ and of the thickness of the oxide layer are carried out by the digital part of the measurement circuits. In the construction illustrated in FIG. 6, the digital part comprises a sampler 40 whose sampling rate is advantageously fixed by a sensor 42 measuring the x movement of table 26, formed for example by a digital encoder. The incrementation pitch of the sensor is chosen as a function of the desired resolution for the measurement.

The successive samples are digitized in an analog-digital converter or ADC 41, the number of quantification levels being chosen as a function of the desired accuracy of measurement of the oxide thickness. In practice, when a dynamic range of $10^3$ is desired (for example for processing a signal of from 0 to 10 Volts with a resolution of 10 mV) a quantification over 10 bits is required. A commercial ADC can be used which quantifies each sample over 12 bits. The successive digital samples are applied to a computer 44 having a program memory 46 and a working RAM 48. The computer is programmed for:

determining, for example by derivation and determination of zero crossings, the successive minima of signal X, computing the positions $x_1$, $x_2$, $x_3$, from the information received from the displacement sensor 42 and deriving therefrom, by subtraction, the distances between rods along the path travelled by the probe, computing, from a calibration curve (of the kind shown in FIG. 2) which is also stored, the oxide thickness, from minima $V_1$, $V_2$, $V_3$, etc.

The results of the measurement may be stored in a mass memory 50 (hard disk, diskette, etc.) and displayed in real time or in delayed time.

Because signal X has a minimum value when the probe is exactly aligned with the axis of a rod, the measurements may be very accurate. Because the measurements are made on line, by a simple rectilinear movement of table 46, they may be much faster than in the prior art methods.

The calibration curve of FIG. 2 may be prepared prior to the measurement of the oxide thicknesses on the rods of a sheet and stored, for the entire time necessary for checking an assembly, in map form in RAM 48. A more advantageous solution consists in periodically making a check and possibly updating the calibration curve of FIG. 2 between successive measurement sequences. For that purpose, it is possible to locate the head on table 26 as shown in FIGS. 5A and 5B.

A plate 54 is mounted on platform 52, movable along x and y, of the cross-table 26. The plate 54 may rotate on platform 52 about an axis 56 parallel to the axis of rods 20 to be checked (z axis). Displacement means, shown schematically as a jack 58 inserted between plate 54 and platform 52, are arranged for pivoting the plate 54 between a measurement position, in which it is shown in FIG. 5B, and calibration positions. The plate carries case 22 containing a head 28 which may be of the kind shown in FIG. 4.

In the measurement position shown in FIG. 5B, the axis of case 22 and of probe 33 is directed orthogonally to the sheet of rods 20. When table 26 is actuated for moving case 22 in direction x, the operation is as described.

For calibrating the device, the cross table 26 is controlled so as to move case 22 clear of the sheet of rods 20. Then jack 58 is actuated for moving case 22 in the direction shown by arrow f in FIG. 5A, from the measurement position. Platform 52 carries several calibration tubes 60 whose axes are parallel to those of rods 20 and which are covered with calibrated thicknesses of oxide, generally ranging from a small thickness up to the maximum thickness to be measured. These tubes 60 may be sheath sections identical to those of rods 20, oxidized over known and predetermined depths. The sheath sections are disposed along an arc of a circle, at a distance from axis 56 such that, during its movement, the probe of case 22 follows them under the same conditions in which it travels past the sheaths of rods 20 during measurement. The oxide thicknesses are, for example, chosen to correspond to the points indicated in FIG. 2. The signal minima obtained are stored by computer 44, at the same time as the known thicknesses. Calculation of the oxide thicknesses on the sheaths of rods 20 then takes place by interpolation, using existing and well-known programs.

Figure 8:
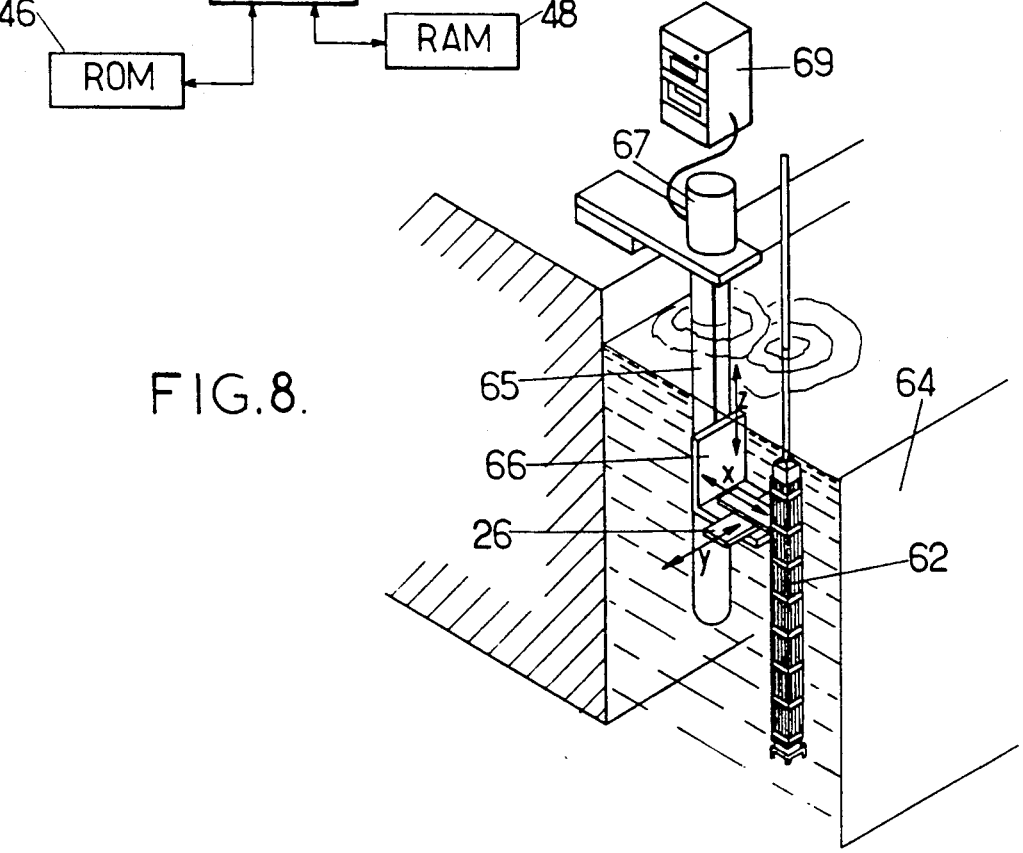
FIG. 8 is a diagram showing a possible arrangement of an assembly to be checked and a device according to the invention, in a pool for storing irradiated fuel assemblies.

FIG. 8 shows a possible arrangement of a nuclear fuel assembly 62 to be checked and a measurement device according to the invention. Assembly 62 is immersed in a storage swimming pool 64, at sufficient depth to provide biological protection. The device comprises a column 65 on which is mounted a carriage 66 which a motor 67 can move vertically, in direction z. This carriage carries the cross table 26. With this device, the distance between the rods and the thickness of oxide on the rods of a peripheral bundle occupying one face of the assembly can be measured at several levels z. It is then possible to turn assembly 66 so as to make the measurements on the lateral bundle occupying another face. The circuits for using the signal controlling the movements may be grouped together in a control cabinet 69.

The device described up to now can be used only for checking the rods belonging to the lateral sheets of an assembly and for carrying out such a check on the generatrices directed outwardly of the assembly.

Figure 9:
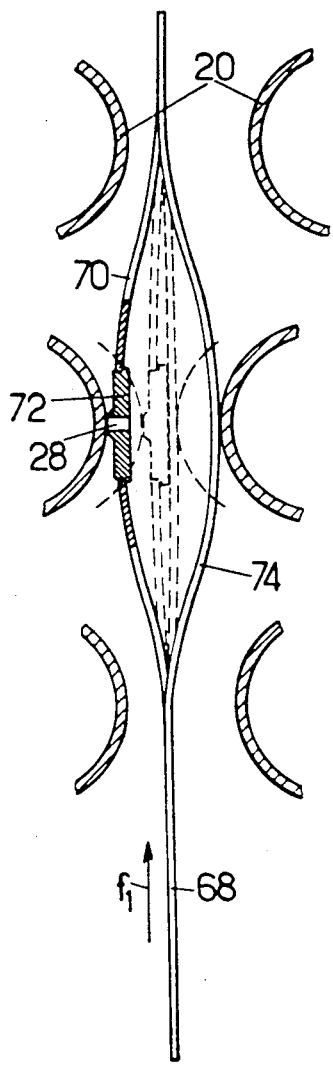
FIGS. 9, 10 and 11 are diagrams showing, in cross-section and in perspective, eddy current probe heads for making measurements between sheets of rods of a fuel assembly.

The modifications shown in FIGS. 9 and 12, on the other hand, make it possible to carry out measurements within an assembly.

Figure 10:
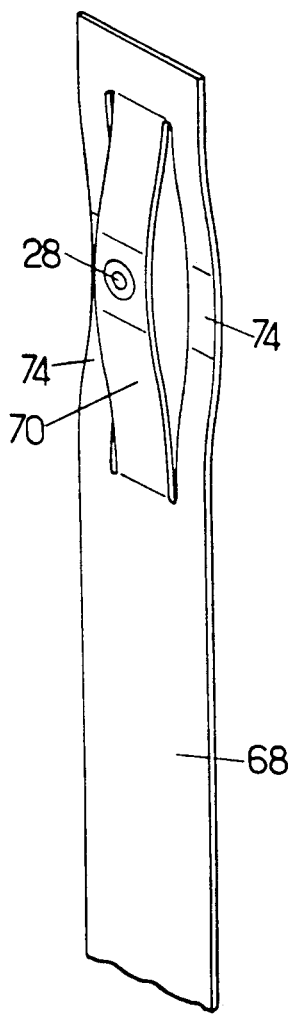

FIGS. 9 and 10 schematically show a first embodiment. A measurement head 28 is carried by a plate 68 which will be designated hereafter by the term "sword". This head may have a construction similar to that shown in FIG. 4. However, the available distance between two sheets will often be insufficient for housing therein the reference coil 16a in addition to the measurement coil 16. The reference coil is then transferred to a part of sword 68 which remains continuously outside the fuel assembly. Sword 68 has a sufficiently small thickness to be able to pass between two bundles of rods 20. It is made of a material having an electric resistance appreciably higher than that of the sheaths of the rods. In practice, an insulating material sword 68 may be used, made for example from a reinforced synthetic resin or an inoxidizable alloy such as "Inconel 718".

Sword 68 has a solid portion and an end portion in which are formed slots defining a central sector 70 which carries head 28, possibly through an insulating washer 72, and two lateral sectors 74. The central sector 70 has a curvature in a direction opposite of that of the lateral sectors. The curvature at rest of the sectors is such that the probe, situated at the middle of sector 70, is in sliding abutment against the rods and follows their profile when the sword 68 is moved in the direction of arrow $f_1$ or in the opposite direction.

The material forming the sword is chosen so that the sectors resiliently bend when necessary for the probe to slide between rods 20 whose spacing is less than the nomimal spacing, as shown, for example, in broken lines in FIG. 9. The shape at rest of the sectors is such that head 28 remains firmly applied against rods 20 even for the maximum possible spacing between the mutually facing surfaces of the rods.

Figure 11:
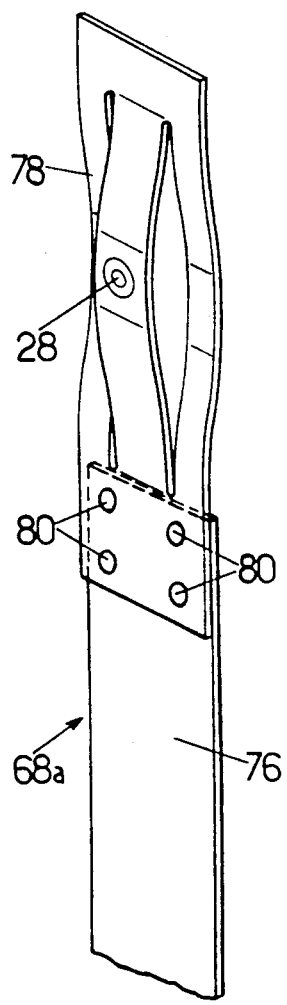

In the embodiment shown schematically in FIG. 11, sword 68a is in two parts: it comprises a blade 76, made for example of flexible insulating material, and an end section 78 identical to that shown in FIGS. 9 and 10, which may be made of "Inconel", fixed to the plate by rivets 80.

Other constructions of the mechanical part of the sword are possible, for example of the kind shown in European 0,178,860, which however carries an ultrasonic probe.

FIG. 12 shows a possible structure for mounting the sword shown in FIG. 9 or 10 in a device for calibration by comparison with calibrated tubes. The device of FIG. 12 further comprises a cross movement table having a platform 26 movable along x and y. Sword 68 is mounted on the platform, or on a plate fixed on the platform, by means making it possible to adjust the position of the sword and having a safety function.

The means as shown may be regarded as comprising a safety block 82, limiting the forces on the sword, mounted on platform 26, and a clamp 84 for connecting sword 68 to the safety block.

The clamp 84 has a rod portion 86 for connection with the safety block and a fork receiving a two-part sword carrier 88. Four adjustment and locking screws 90 make it possible to adjust accurately the orientation and the position of sword 68.

The safety block 82 limits the forces exerted on the sword in the direction x of sweeping the rods 20. It comprises a casing 91 defining a chamber in which a collar 92 of rod 86 may slide. Casing 91 is fixed to platform 26 by any means, such as screws 94. It contains a spring 96 which biases collar 92 to the maximum projecting position in which it is shown in FIG. 12. Spring 96 is calibrated so as to be compressed when the inward driving force exerted on rod 86 exceeds a given threshold, fixed as a function of the maximum tolerable force on the probe and the sword. The end of rod 86 is in abutment against a switch 98 so that any inward movement of the rod from the position shown in FIG. 12 opens the switch 98, placed in a safety circuit which then causes movement in direction x to stop.

The safety block will in general be completed by additional switches controlled by the sword or platform 52, preventing any movement in directions y and z when sword 68 is engaged between rods 20.

The probe may, as in the case shown on FIGS. 5a and 5b, be calibrated by comparison with several sheath sections 60 carrying different known thicknesses of oxide, ranging for example from 10 to 100 μm, and a non-oxidized sheath section 100 defining an initial reference point. The sheath sections 60 and 100, as well as dummy sheath sections 102, parallel to the first ones and intended to provide calibration under conditions representative of those met with by the probe inside the assembly, are carried by a support 104 fixed in direction x, but movable along directions z and y for making a new calibration possible before each series of measurements on a sheet of rods.

In the embodiment shown in FIG. 12, support 104 is placed between the assembly 62 to be checked and platform 26, rods 60 being in the extension of the sheet of rods 20 to be checked. The sword 68 then has a sufficient length for the measurement probe 13 to be able to successively sweep the calibration sheath sections and the sheaths of rods 20 to be checked. Reference coil 16a may be placed in the immediate vicinity of clamp 84.

The sequence of operations during a cycle for measuring the gap between the rods of a sheet and measuring the thickness of oxide is then as follows.

Probe 13 is first of all brought to elevation z where the measurement is to be made, in line with a space between two sheets, by manually controlling the vertical movement along z, then the transverse movement along y. The sword 68 is advanced until the probe confronts the first sheath section 100, by manually control in direction x. If necessary, the measurement circuit may then be balanced.

The following sequence of operations may be entirely automatic, following triggering of an inward movement of the sword in direction x. Successively calibration is performed by sweeping sheath sections 60 storage of the results, and then measurement over the entire row of rods.

At the end of the advance movement of the sword, the latter is withdrawn automatically or responsive to a manual control, with possibly a new measurement and/or a new calibration.

With the device shown in FIGS. 9 to 12, it is possible to check the rods of an assembly along four generatrices and at relatively closely spaced points in the longitudinal direction, because of the fast measurements. The use of flexible sectors for carrying the probe makes it possible for the latter to slide not only between two sheaths, but also between a sheath and a guide tube of the kind found in existing fuel assemblies.

We claim:

1. A method for simultaneously measuring a distance between substantially parallel metal tubes forming a sheet of tubes and a thickness of respective oxide layers covering the tubes, said method comprising the steps of
   (a) moving an eddy current probe parallel to the sheet while maintaining said probe applied to successive tubes of the sheet;
   (b) recording an electric signal delivered by the probe and representing impedance variations of said probe while measuring displacement of said probe;
   (c) computing distances between successive ones of said tubes from measurement of the amounts of said displacement of said probe between occurrences of extreme values of said electric signal corresponding to successive extreme values of said impedance; and
   (d) deriving the thickness of the oxide layers on successive ones of said tubes from successive comparisons between respective extreme values of said signal and at least one value obtained by measurement of the impedance value of the probe applied on a standard tube carrying a predetermined known thickness of said oxide.

2. Method according to claim 1, further comprising the step of moving the probe along and in contact with additional standard tubes having mutually different oxide thicknesses and distributed over a range of oxide thicknesses to be measured.

3. Device for simultaneously measuring distances between successive substantially parallel metal tubes forming a flat sheet and a thickness of oxide on said tubes, said device comprising
  (a) an eddy current probe;
  (b) means for moving said probe along a predetermined direction transverse to said metal tubes;
  (c) resilient means for biasing said probe transversely to said direction and applying said probe to successive ones of said tubes upon movement of said probe;
  (d) measurement means for delivering a signal which is responsive to electric impedance of said probe;
  (e) means for processing said signal and determining extreme values of said signal;
  (f) means for measuring amounts of movement of said probe along said predetermined direction from a predetermined reference position and for storing those values of said amounts from which the signal has said extreme values; and
  (g) means for computing the thickness of said oxide layer on each of said tubes by comparing said extreme values with at least one value corresponding to a predetermined known thickness of said oxide.

4. Device according to claim 3, further comprising a cross-movement table carrying a platform, said probe being carried by said platform through said resilient means for biasing said probe in one of the direction of movement of said table, and means for first moving said platform with respect to the table in a direction and by amounts such that said probe moves along a plurality of mutually parallel calibration tubes having predetermined known oxide thicknesses and then moving said probe to a measurement angular position where said probe is orthogonal to the direction of movement across the tubes of said sheet.

5. Device according to claim 3, wherein said probe is part of a measurement head having a frusto-conical end portion, the amount of conicity of said end portion being such that said head follows the profile of the tubes during movement of said probe parallel to said sheet and orthogonally to said tubes.

6. Device according to claim 5, wherein said head has a reference coil arranged to generate a field whose field lines traverse a non-oxidized tube section embedded in said head, said tube section constituting a reference standard and said measurement means comparing the output signals of a coil of the measurement probe and of the reference coil.

7. Device according to claim 4, wherein said platform is carried by the table through means for rotating said platform about an axis which is parallel to the calibration tubes which are arranged along a cylindrical row centered on an axis of rotation of said platform on said table.

8. Device according to claim 3, wherein said resilient means comprise a strip mechanically connecting said probe and said means for moving the probe, said strip having a thickness which is small as compared to its width, having a terminal portion formed with a widthwise central sector carrying said probe and two widthwise lateral sectors, said central sector being bent in a direction opposite to that of the lateral sectors.

9. Device according to claim 8, wherein said strip is carried by said cross-movement table through means for adjusting the position of the strip and with force limiting means.

10. Device according to claim 8, comprising a row of calibration tubes carrying layers of oxide having different known thicknesses and a row of dummy tube sections aligned parallel to said calibration tubes and separated from said calibration tubes by a gap which is in alignement with said strip.

* * * * *